US012693738B2

(12) United States Patent
Wang et al.

(10) Patent No.: US 12,693,738 B2
(45) Date of Patent: Jul. 28, 2026

(54) EYE TRACKING VIA DENSE POINT CLOUD SCANNING USING A LIGHT BEAM SOURCE AND A REFLECTIVE AND/OR DIFFRACTIVE SURFACE

(71) Applicant: Meta Platforms Technologies, LLC, Menlo Park, CA (US)

(72) Inventors: Youmin Wang, Bellevue, WA (US); Ehsan Vadiee, Bothell, WA (US); Mohamed Tarek Ahmed El-Haddad, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 19/057,573

(22) Filed: Feb. 19, 2025

(65) Prior Publication Data

US 2025/0291411 A1     Sep. 18, 2025

Related U.S. Application Data

(60) Provisional application No. 63/566,740, filed on Mar. 18, 2024.

(51) Int. Cl.
*G06F 3/01* (2006.01)
*G02B 27/01* (2006.01)

(52) U.S. Cl.
CPC ......... *G06F 3/013* (2013.01); *G02B 27/0172* (2013.01)

(58) Field of Classification Search
CPC ...... G02B 27/0172–2027/0187; G02B 27/009; G06F 3/011–013
See application file for complete search history.

(56) References Cited

U.S. PATENT DOCUMENTS

| | | | |
|---|---|---|---|
| 2019/0154895 A1* | 5/2019 | Satake | G02B 5/1814 |
| 2020/0073031 A1* | 3/2020 | Born | G02B 27/0101 |
| 2023/0418089 A1* | 12/2023 | Kasegawa | G02B 5/32 |
| 2024/0219723 A1* | 7/2024 | Mizuno | G02B 26/10 |

* cited by examiner

*Primary Examiner* — Hang Lin
(74) *Attorney, Agent, or Firm* — Greenberg Traurig, LLP

(57) ABSTRACT

Augmented and/or virtual reality (AR/VR), near-eye display devices that implement eye tracking via dense point cloud scanning are disclosed. In examples, an eye tracking system for an augmented reality/virtual reality (AR/VR) display device comprises a light beam emission and sensor element located in a first location of the display device to emit a light beam. The eye tracking system may comprises a redirection element located in a second location of the display device to redirect the light beam to illuminate one of line-of-sight and a field-of-view (FOV) of the display device.

18 Claims, 10 Drawing Sheets

700

500

502

HOE or dichroic/hot mirror

501

501

700

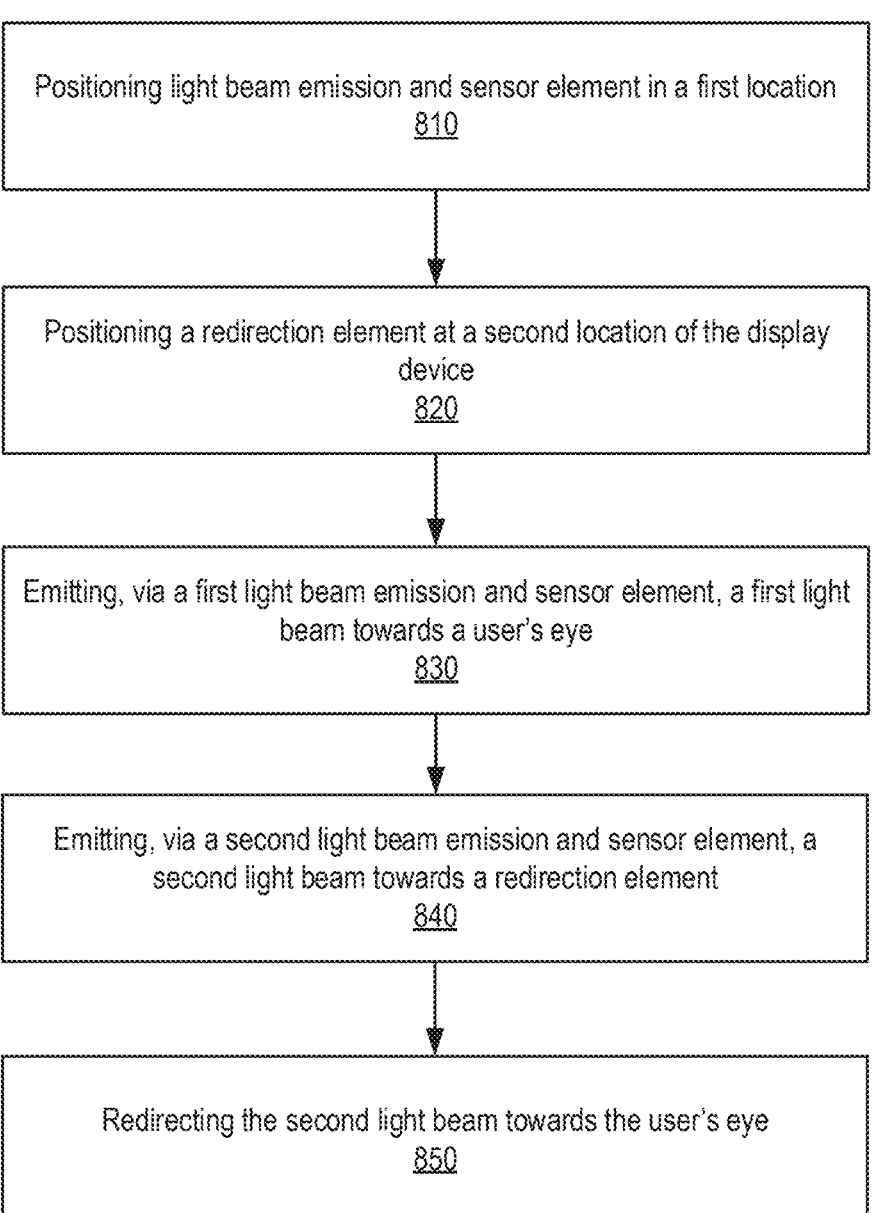

800

Positioning light beam emission and sensor element in a first location
810

Positioning a redirection element at a second location of the display device
820

Emitting, via a first light beam emission and sensor element, a first light beam towards a user's eye
830

Emitting, via a second light beam emission and sensor element, a second light beam towards a redirection element
840

Redirecting the second light beam towards the user's eye
850

FIG. 8

EYE TRACKING VIA DENSE POINT CLOUD SCANNING USING A LIGHT BEAM SOURCE AND A REFLECTIVE AND/OR DIFFRACTIVE SURFACE

PRIORITY

The present application claims priority to U.S. provisional patent application Ser. No. 63/566,740, filed on Mar. 18, 2024, which is incorporated by reference in its entirety.

TECHNICAL FIELD

This provisional patent application relates generally to augmented reality (AR) and/or virtual reality (VR) near-eye display devices, and in particular, to implementing eye tracking via a dense point cloud scanning using a light beam source and a reflective and/or diffractive surface.

BACKGROUND

Many augmented reality (AR) and virtual reality (VR) devices implement eye tracking. For example, in some instances, eye tracking technologies may monitor (or "sense") a user's "gaze" during use of an augmented reality (AR) and virtual reality (VR) device.

In some instances, self-mixing interferometry (SMI) may be implemented as a sensing technique. In some examples, self-mixing interferometry (SMI) may utilize a vertical-cavity surface-emitting laser (VCSEL) and a photodetector (PD).

In some instances, these self-mixing interferometry (SMI) elements may be included in an optical "stack" (or "pancake stack") of a display device. Moreover, in some instances, the optical stack may be located in a field-of-view (FOV) of a display device, such as being embedded in a display lens of the display device. In some instances, this may lead to issues in visibility and design aesthetic. Moreover, in some instances, issues with integration of these elements (e.g., trace placement, component bonding, etc.) may be complex, and may lead to increased costs.

BRIEF DESCRIPTION OF DRAWINGS

Features of the present disclosure are illustrated by way of example, and are not limited in the following figures, in which like numerals indicate like elements. One skilled in the art will readily recognize from the following that alternative examples of the structures and methods illustrated in the figures can be employed without departing from the principles described herein.

FIG. 8 illustrates a flow diagram for a method for implementing eye tracking via a dense point cloud scanning using a light beam source and a reflective and/or diffractive surface, according to some examples.

DETAILED DESCRIPTION

Figure 1:
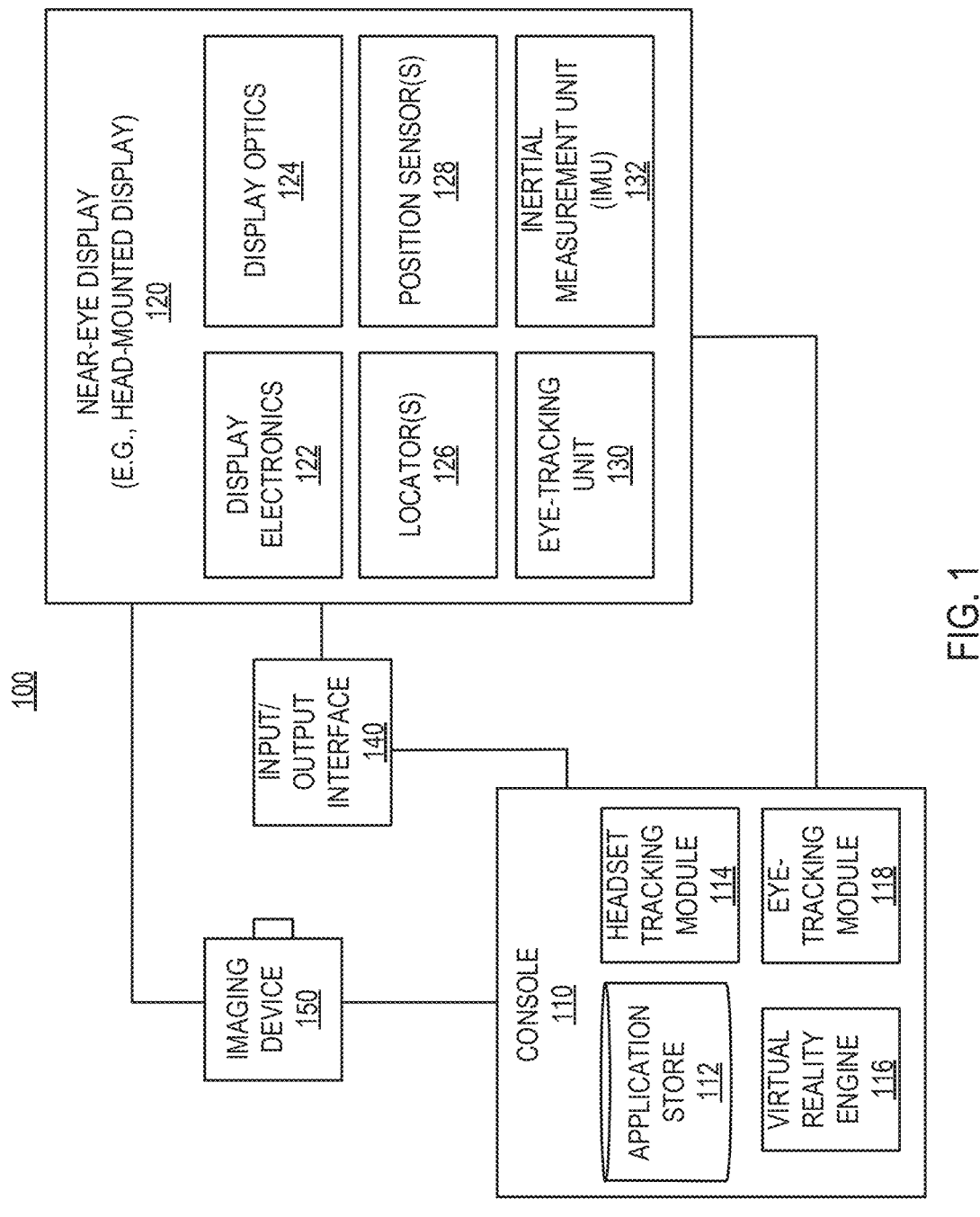
FIG. 1 illustrates a block diagram of an artificial reality (AR) system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail to not obscure the present application. As used herein, the terms "a" and "an" are intended to denote at least one of a particular element, the term "includes" means includes but not limited to, the term "including" means including but not limited to, and the term "based on" means based at least in part on.

Many augmented reality (AR) and virtual reality (VR) devices implement eye tracking. For example, in some instances, these technologies may be utilized to perform eye tracking to monitor (or "sense") a user's "gaze" during use of a device.

In some instances, imaging via scanning technologies may be implemented as an effective approach to eye tracking. In some examples, to implement eye tracking, some display devices may implement micro-electromechanical systems (MEMS). For example, in some instances, micro-electromechanical systems (MEMS) may be provided to utilize light beam (e.g., laser) scanning to implement eye tracking and/or gaze-tracking.

In some instances, self-mixing interferometry (SMI) may be implemented as a sensing technique. In some examples, self-mixing interferometry (SMI) may integrate, among other things, a vertical-cavity surface-emitting laser (VCSEL) and a photodetector (PD) to, for example, sense a distance and velocity of a target. In some examples, the self-mixing interferometry (SMI) elements (e.g., vertical-cavity surface-emitting laser (VCSEL), photodetector (PD), etc.) may be integrated in one chip with exceedingly small sizing (e.g., smaller than two-hundred (200) microns ($\mu$m)× two-hundred (200) microns ($\mu$m)).

In some examples, one or more captured points associated with a measured area (e.g., from light beams emitted by an optical system implementing self-mixing interferometry (SMI)) may be referred to as a "point cloud." In some examples, the one or more captured points that may be captured from a smaller space or surface area may be referred to as a "dense" point cloud.

In some examples, implementation of self-mixing interferometry (SMI) in such settings may also come with drawbacks. For example, in some instances, self-mixing interferometry (SMI) elements may be included in an optical stack. In some instances, the optical stack may be located in a field-of-view (FOV) of a display device, such as in a display lens (e.g., made of glass or polymer) of a display device. It may be appreciated that, in some instances, this may lead to issues in visibility and design aesthetic. Furthermore, in some instances, integration of these elements (e.g., trace placement, component bonding, etc.) may be complex, and may lead to increased costs.

Systems and methods described herein enable, among other things, dense point cloud scanning using a light beam source and a reflective and/or diffractive surface to, among other things, enhance eye tracking and increase field-of-view (FOV), tracking speed(s), and tracking resolution(s). In some examples, the systems and methods described herein may implement a light beam scanning apparatus (e.g., a self-mixing interferometry (SMI) device) to direct one or more light beams (e.g., from a vertical-cavity surface emitting laser (VCSEL)) towards a user's eye. Specifically, and for example, the systems and methods described herein may implement point cloud scanning, where a light beam scanning apparatus may capture (and measure) one or more points in a segment of space.

In some examples, a light beam scanning apparatus may be located in a first location of a display component. In some examples, the first location of the display component may be a temple arm of a pair of virtual reality (VR), augmented reality (AR), and/or mixed reality (MR) wearable glasses.

In some examples, one or more light beams emitted from a beam scanning apparatus may be directed toward a redirection element that may be located in a second location of a display component. As used herein, a "redirection element" may include any device or component that may be utilized to change a direction of a (incoming) light beam. In some examples, the second location of the display component may be a display lens of a pair of virtual reality (VR), augmented reality (AR), and/or mixed reality (MR) wearable glasses. In some examples and as will be discussed further below, the redirection element may be embedded within an optical stack located in a field-of-view (FOV) of a display device.

In some examples, a redirection element may be, among other things, a reflective or diffractive surface. In the case of reflective redirection elements, the redirection element (e.g., located in a second location on a display device) may reflect a (incoming) light beam (e.g., originating from a first location on the display device) coming from a first direction towards a second direction, and towards a target location (e.g., towards a user's eye). In some examples, and as will be discussed further below, the reflective redirection element (hereinafter interchangeably referred to as "reflective element" or "reflective surface") may be a reflective film (e.g., a dielectric film, such as an infrared film or "hot mirror").

In other examples, the redirection element (e.g., located in the second location on a display device) may diffract an (incoming) light beam coming from a first direction (e.g., originating from a first location on the display device) towards a second direction, and towards a target location (e.g., towards a user's eye) as well. In some examples, and as will be discussed further below, the diffractive redirection element (hereinafter interchangeably referred to as "diffractive element" or "diffractive surface") may be a holographic optical element (HOE) or a meta-surface lens.

In some examples, the systems and methods described herein may include an eye tracking system for an augmented reality (AR)/virtual reality (VR) display device, the eye tracking system including a light beam emission and sensor element located in a first location of the display device and a redirection element located in a second location of the display device. In some examples, the light beam emission and sensor component may include one or more of a light beam source, a micro-electromechanical system (MEMS), a photodetector (PD), and/or a lens. In some examples, the first location may be a temple arm of the display device and the second location may be a lens of the display device. In some examples, the redirection element may include a diffractive surface, and in other examples, the redirection element may include a reflective surface.

In some examples, the systems and methods described herein may enable implementation of in-field sensing technologies that may acquire intensity, depth, velocity, and other useful information for eye tracking. Moreover, in some examples, the systems and methods described herein may enable minimal form-factors. Specifically, a first element may be implemented in a first location (e.g., embedded directly into a display lens of a display device) of a display device, and a second element may be located in a second location (e.g., in a temple arm of a display device). This may eliminate a need to provide the first element and the second element in a same location.

FIG. 1 illustrates a block diagram of an artificial reality system environment 100 including a near-eye display, according to an example. As used herein, a "near-eye display" may refer to a device that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an input/output interface 140 (optional), each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV) of a display device. As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a head-mounted display (HMD), a pair of glasses, or other similar wearable eyewear or device. Examples of the near-eye display 120 are described below with respect to FIGS. 2 and 3. Additionally, in some examples, the functionality described herein may be used in a head-mounted display (HMD) or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye tracking unit 130. In some examples, the near-eye display 120 may also include one or more locators 126, one or more position sensors 128, and an inertial measurement unit (IMU) 132. In some examples, the near-eye display 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display 120 may include a light beam source (not shown), which may form an image in angular domain for direct observation by a viewer's eye through a pupil. The light beam source may employ a controllable light source (e.g., a laser source) and micro-electromechanical systems (MEMS) beam scanner to create a light field from, for example, a collimated light beam. In some examples, the same light beam source or a different light beam source may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube deflector, a reflective marker, a type of light source that contrasts with an environment in which the near-eye display 120 operates, or any combination thereof.

In some examples, the external imaging device 150 (optional) may include one or more cameras, one or more video cameras, any other device capable of capturing images including the one or more locators 126, or any combination thereof. The external imaging device 150 may be configured to detect light emitted or reflected from the one or more locators 126 in a field of view of the external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye tracking unit 130 may include one or more eye tracking systems. As used herein, "eye tracking" may refer to determining an eye's position or relative position, including orientation, location, and/or gaze of a user's eye. In some examples, an eye tracking system may include an imaging system that captures one or more images of an eye and may optionally include a light emitter, which may generate light (e.g., a fringe pattern) that is directed to an eye such that light reflected by the eye may be captured by the imaging system (e.g., a camera).

In some examples, the near-eye display 120 may use the orientation of the eye to introduce depth cues (e.g., blur an image outside of the user's main line of sight), and may collect heuristics on the user interaction in the virtual reality (VR) media (e.g., time spent on any particular subject, object, or frame as a function of exposed stimuli). Other functions that may be based in part on the orientation of at least one of the user's eyes may be implemented as well. In some examples, because the orientation may be determined for both eyes of the user, the eye tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application, or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display 120 for presentation to the user.

In some examples, a location of a light beam source of a display system may be adjusted to enable any number of design modifications. For example, in some instances, a light beam source may be located in front of a viewer's eye (i.e., "front-mounted" placement). In a front-mounted placement, in some examples, a light beam source of a display system may be located away from a user's eyes (i.e., "world-side"). In some examples, a head-mounted display (HMD) device may utilize a front-mounted placement to propagate light towards a user's eye(s) to project an image.

In some examples, the systems and methods described herein may implement in-field self-mixing interferometry (SMI) via one or more of the components of the near-eye display 120 illustrated in FIG. 1. For example, in some instances, the eye tracking unit 130 may implement a laser source (e.g., a vertical-cavity surface-emitting laser (VC-SEL)) at a first location on the near-eye display 120. The laser source may emit a light beam that may be directed toward a redirection element (as described herein) at a second location on the near-eye display 120. In some examples, the redirection element may then redirect the light beam to illuminate some or all of line-of-sight and/or field-of-view (FOV) of the near-eye display 120, and may enable in-field sensing technologies that may acquire intensity, depth, velocity, and other useful information for eye tracking.

Figure 2A:
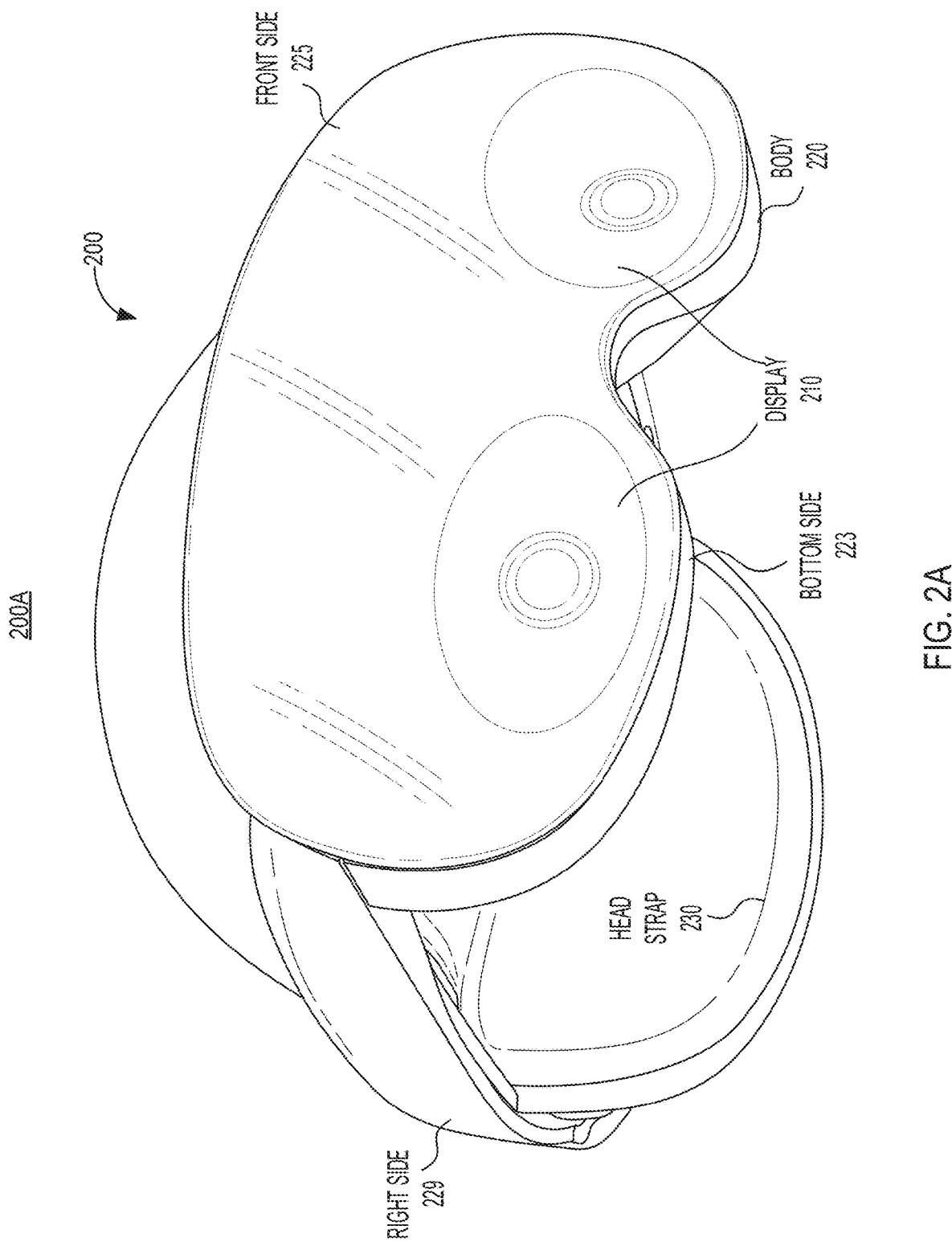
FIGS. 2A-2C illustrate various views of a near-eye display device in the form of a head-mounted display (HMD) device, according to examples.
Figure 2B:
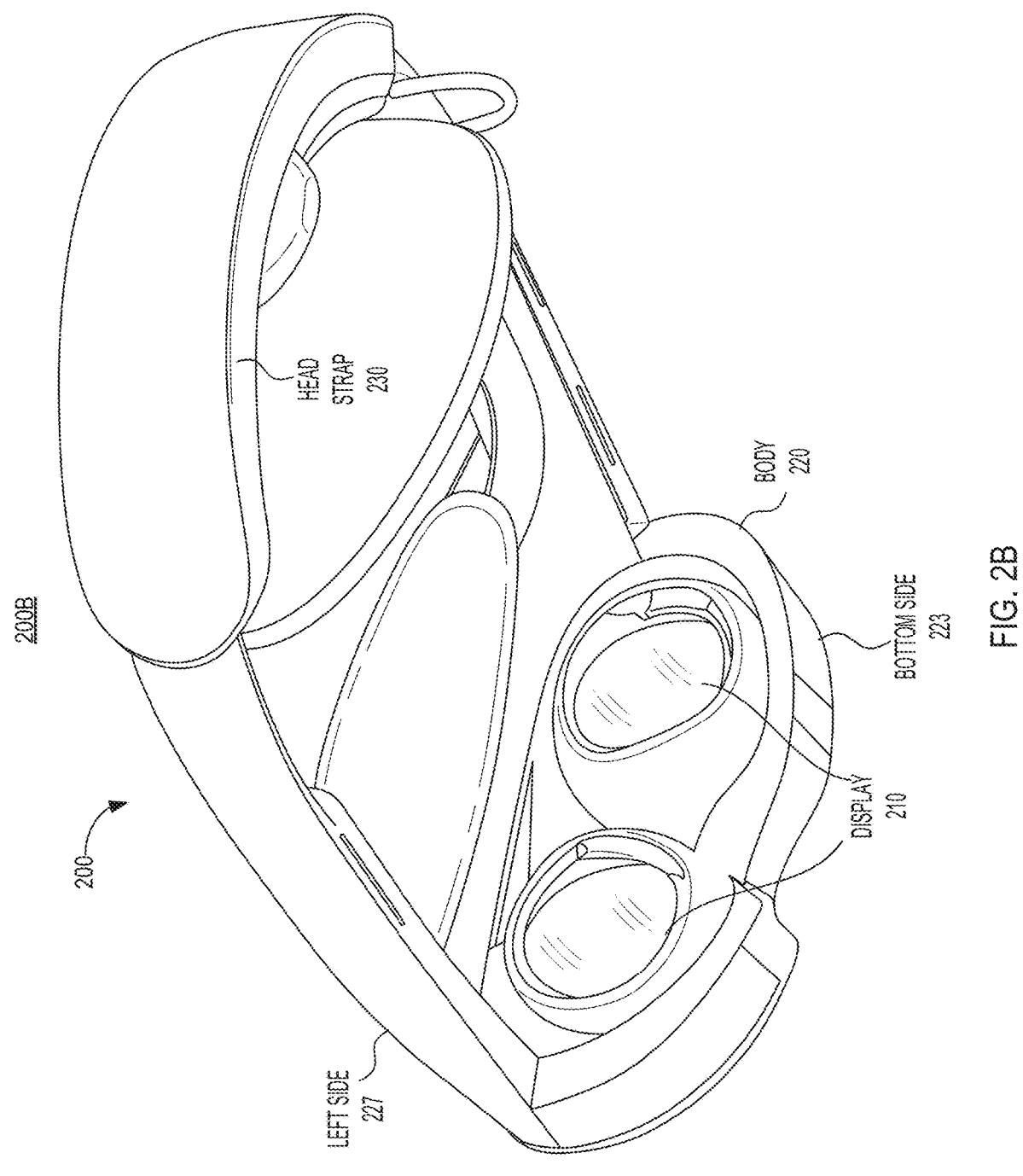
Figure 2C:
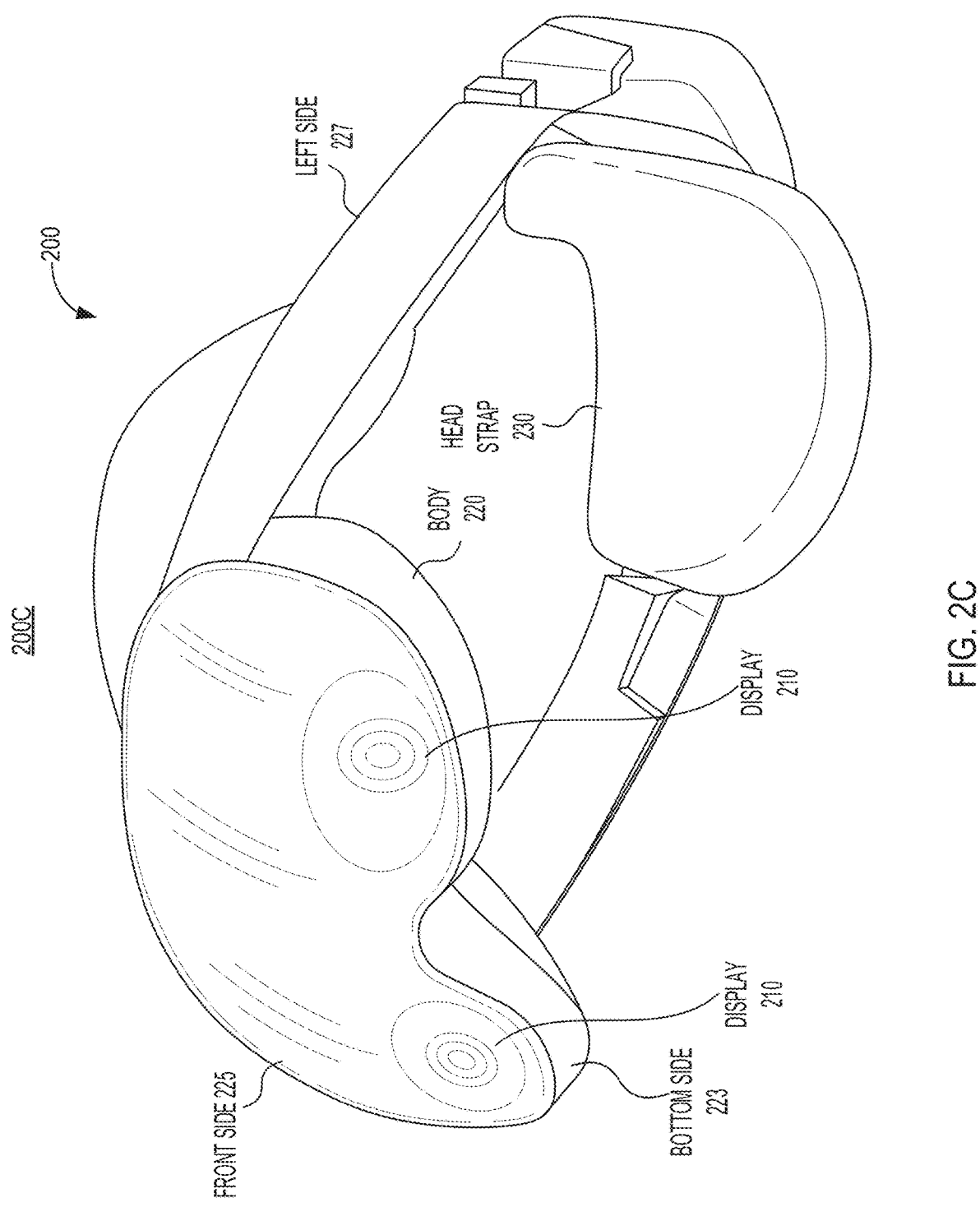

FIGS. 2A-2C illustrate various views of a near-eye display device in the form of a head-mounted display (HMD) device 200, according to examples. In some examples, the head-mounted device (HMD) device 200 may be a part of a virtual reality (VR) system, an augmented reality (AR) system, a mixed reality (MR) system, another system that uses displays or wearables, or any combination thereof. As shown in diagram 200A of FIG. 2A, the head-mounted display (HMD) device 200 may include a body 220 and a head strap 230. The front perspective view of the head-mounted display (HMD) device 200 further shows a bottom side 223, a front side 225, and a right side 229 of the body 220. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components such as a display 210 to present a wearer augmented reality (AR)/virtual reality (VR) content and a camera to capture images or videos of the wearer's environment.

As shown in the bottom perspective view of diagram 200B of FIG. 2B, the display 210 may include one or more display assemblies and present, to a user (wearer), media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the user may interact with the presented images or videos through eye tracking sensors enclosed in the body 220 of the head-mounted display (HMD) device 200. The eye tracking sensors may also be used to adjust and improve quality of the presented content.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface for communicating with a console communicatively coupled to the head-mounted display (HMD) device 200 through wired or wireless means. In some examples, the head-mounted display (HMD) device 200 may include a virtual reality engine (not shown) that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine may be used for producing a signal (e.g., display instructions) to the display 210. In some examples, the head-mounted display (HMD) device 200 may include locators (not shown), which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a light beam source mounted in a display system may be placed near and/or closer to a user's eye (i.e., "eye-side"). In some examples, and as discussed herein, a light beam source for a display system shaped like eyeglasses may be mounted or positioned in a temple arm (i.e., a top far corner of a lens side) of the eyeglasses. It should be appreciated that, in some instances, utilizing a back-mounted light beam source placement may help to reduce size or bulkiness of any required housing required for a display system, which may also result in a significant improvement in user experience for a user.

In some examples, an in-field scanning system for eye tracking may be implemented in the head-mounted display (HMD) device 200. Hardware (and software) elements may be utilized to gather end-to-end knowledge of a current state of the head-mounted display (HMD) device 200, and implement self-mixing interferometry (SMI) to scan a segment of space (e.g., associated with a viewing user's eye). As the head-mounted display (HMD) device 200 state changes, the systems and methods described herein may periodically reconfigure the aspect and states of individual subsystems illustrated in FIGS. 2A-2C to enable the in-field scanning.

Figure 3:
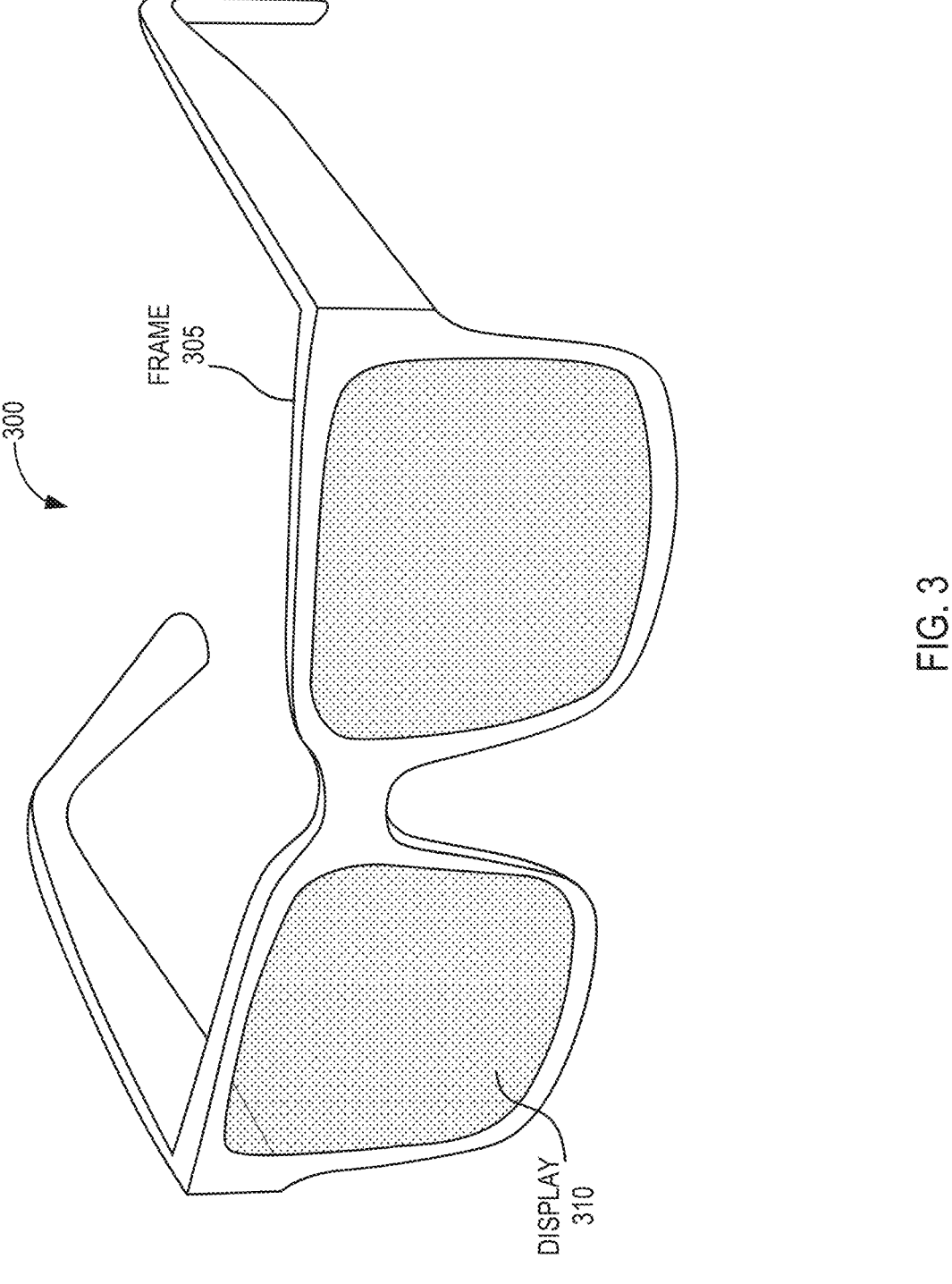
FIG. 3 illustrates a perspective view of a near-eye display in the form of a pair of glasses, according to an example.

FIG. 3 is a perspective view of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1 and 2A-2C. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 310 may include a light beam source, or in place of the display 310 the near-eye display 300 may include a light beam source.

In some examples, the near-eye display 300 may further include various sensors on or within a frame 305. In some examples, the various sensors may include any number of depth sensors, motion sensors, position sensors, inertial sensors, and/or ambient light sensors, as shown. In some examples, the various sensors may include any number of image sensors configured to generate image data representing different fields of views in one or more different directions. In some examples, the various sensors may be used as input devices to control or influence the displayed content of the near-eye display. In addition, the various sensor may provide an interactive virtual reality (VR), augmented reality (AR), and/or mixed reality (MR) experience to a user of the near-eye display 300. In some examples, the various sensors may be used for stereoscopic imaging or other similar applications.

In some examples, an eye tracking system implementing, among other things, a light beam source and a reflective and/or diffractive surface as described herein may be implemented in the frame 305 and/or the display 310 of the near-eye display 300. Specifically, in some examples and as will be described further below, the eye tracking system described may be implemented in-field (e.g., within a field-of-view (FOV) of the near-eye display 300) to scan a segment of space (e.g., associated a viewing user's eye). Moreover, in some examples, the eye tracking system described herein may enable minimal form-factor(s), in that a first element may be implemented in the frame 305, while a second element may be located in the display 310, thereby eliminating a need to provide the first element and the second element in a same location.

Figure 4:
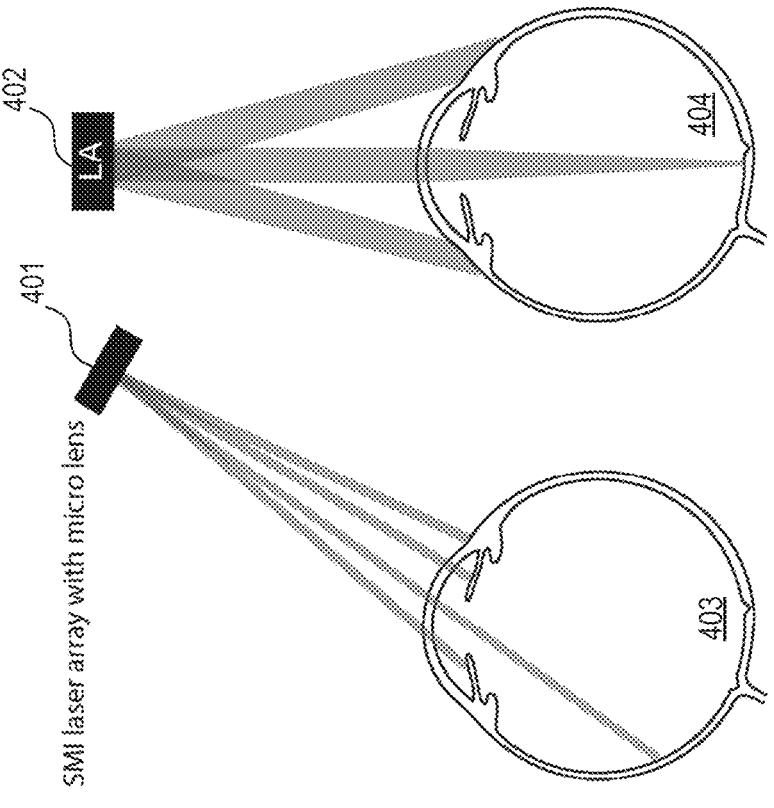
FIG. 4 illustrates an optical system for eye tracking via a dense point cloud scanning using a light beam source and a reflective and/or diffractive surface, according to an example.
Figure 4:
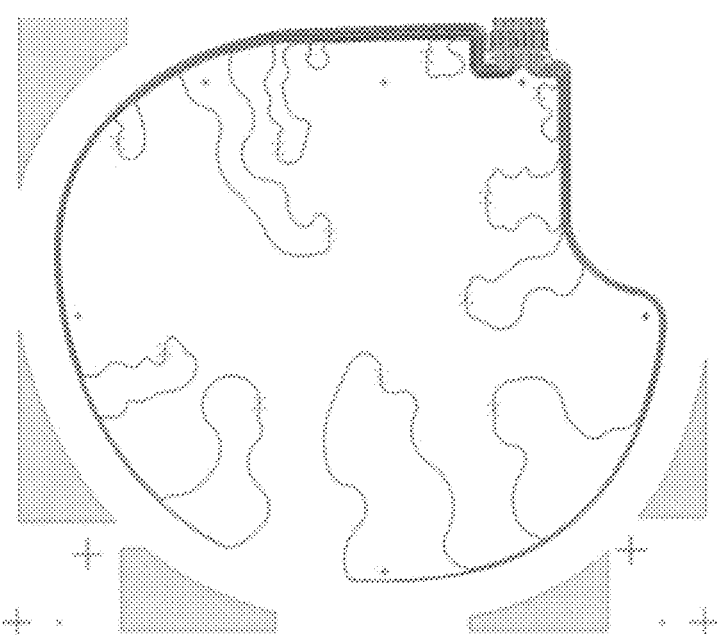

FIG. 4 illustrates an optical system 400 for eye tracking via a dense point cloud scanning using a light beam source and a reflective and/or diffractive surface, according to an example. In some examples, the optical system 400 may implement self-mixing interferometry (SMI), as described above, via one or more laser arrays 401, 402 that may emit one or more light beams directed toward a user's eye 403, 404 and that may be utilized to acquire intensity, depth, velocity, and other useful information for eye tracking.

In some examples, the one or more light beams may be directed (e.g., spread) over a segment of space associated with a viewing user's eye via implementation of a lens located in front of a light beam source (e.g., a vertical-cavity surface emitting laser (VCSEL)). In some instances, this may be referred to as implementing a "fan out" design for the point cloud and, in some examples, may enable coverage of nearly all or an entirety of a viewing user's eye.

Figure 5:
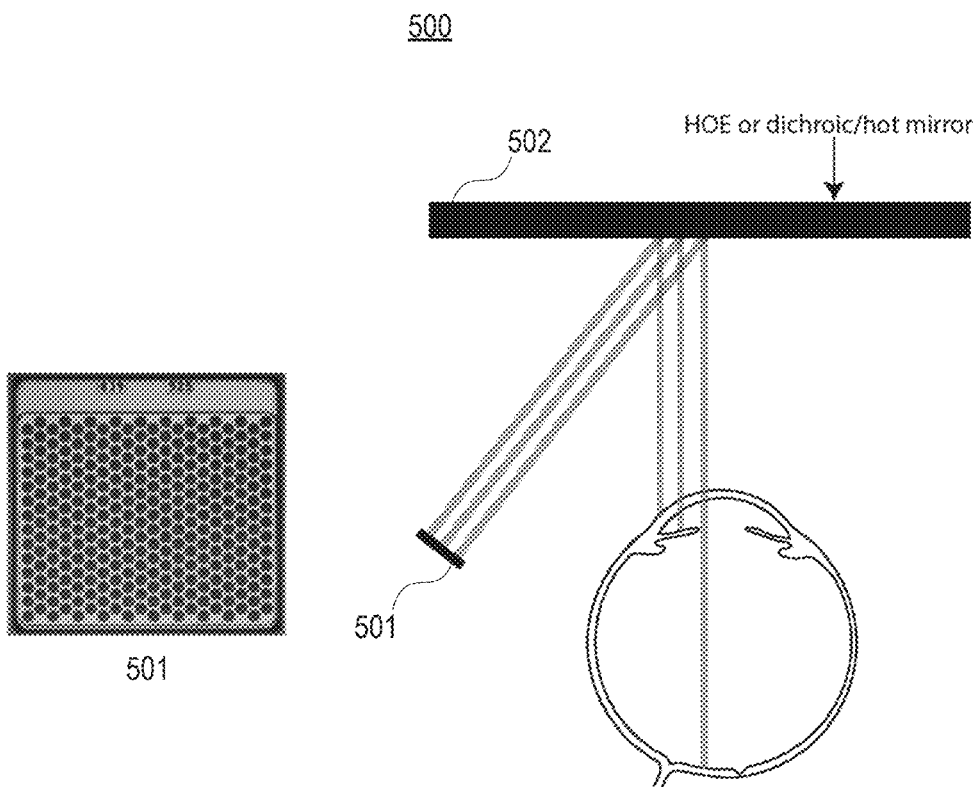
FIG. 5 illustrates an optical system for eye tracking via a dense point cloud scanning using a light beam source and a reflective and/or diffractive surface, according to an example.

FIG. 5 illustrates an optical system 500 for eye tracking via point cloud scanning using a light beam source and a reflective and/or diffractive surface, according to an example. In some examples, the optical system 500 may include, among other things, a light beam emission and sensor element 501 and a redirection element 502. As will be discussed further below, the redirection element 502 may be configured to, among other things, redirect one or more light beams emitted from the light beam emission and sensor element 501 to a part or an entirety of a field-of-view (FOV) of a display device.

In some examples, the light beam emission and sensor element 501 may be a transceiver/receiver (Tx/Rx) device, such as a self-mixing interferometry (SMI) array (or "package"). In some examples, the light beam emission and sensor element 501 may include, among other things, a light beam source (e.g., a vertical-cavity surface emitting laser (VCSEL)), micro-electromechanical systems (MEMS), a photodetector (PD), and/or a lens.

In some examples, the light beam source (e.g., a self-mixing interferometry (SMI) array) of the light beam emission and sensor element 501 may emit a plurality of light beams. In some examples, the lens (e.g., a micro-lens array) of the light beam emission and sensor element 501 may broaden a scope of space over which the plurality of light beams may scan. In particular, in some examples, the lens of the light beam emission and sensor element 501 may be disposed in front of the light beam source of the light beam emission and sensor element 501. In some examples, each element of the lens of the light beam emission and sensor element 501 may have an offset with respect to a corresponding light beam source element underneath. As a result, this may direct (e.g., tilting) one or more light beams in a desired direction. In some examples, the photodetector (PD) of the light beam emission and sensor element 501 may capture (returning) light beams, from which various information associated with eye tracking may be gathered.

In some examples, as discussed above, the redirection element 502 may change a direction of a light beam. In some examples, in addition to this, the redirection element 502 may also collimate a light beam as well.

It may be appreciated that in some examples, the light beam emission and sensor element 501 may be located in a first location of a display device, while the redirection element 502 may be located in a second location of the display device. For example, in the case of the near-eye display 300 illustrated in FIG. 3, the light beam emission and sensor element 501 may be located on a temple arm of the frame 305, while the redirection element 502 may be located (e.g., embedded) in a lens of the display 310.

In some examples, the temple arm of the frame 305 may include a self-mixing interferometry (SMI) package having a plurality of vertical-cavity surface emitting lasers (VCSELs) that may emit a plurality of light beams that may be redirected (e.g., reflected and/or diffracted) via the redirection element 502 towards a viewing user's eye. Accordingly, in some examples, by locating the light beam and sensor element 501 on the temple arm of the frame 305 and the redirection element 502 on the display 310, integration of the self-mixing interferometry (SMI) package on the display

310 may be rendered unnecessary, thereby minimizing form-factor requirements and visibility issues.

In some examples, the redirection element 502 may be a diffractive element. For example, in some instances, the redirection element 502 may implement diffraction via implementation of a holographic optical element (HOE) film. In other examples, the redirection element 502 may be a dichroic mirror or a meta-surfaced lens as well.

In some examples, where the redirection element 502 may be a holographic optical element (HOE) film, the redirection element 502 may include a thin, transparent substrate having a pattern of small (e.g., rectangular) grooves or holes that may be arranged to diffract light. In some examples, when a light beam may be incident on the holographic optical element (HOE) film, it may be diffracted by the grooves or holes to collimate the light beam. It may be appreciated that in some examples, the holographic optical element (HOE) film may provide a low-loss, flexible (e.g., in implementation), compact, and high-efficiency (e.g., for collimation) option.

In other examples, the redirection element 502 may be a reflective element. For example, in some instances, the redirection element 502 may be an reflective film (e.g., a dielectric film, such as an infrared film or "hot mirror"). In some examples, the reflective film may be composed of one or more multi-layer dielectric films that may be tuned to reflect a desired wavelength band and polarization. Furthermore, it may be appreciated that in other examples, the redirection element 502 may also include a combination of reflection and diffraction elements, as described above.

Figure 6:
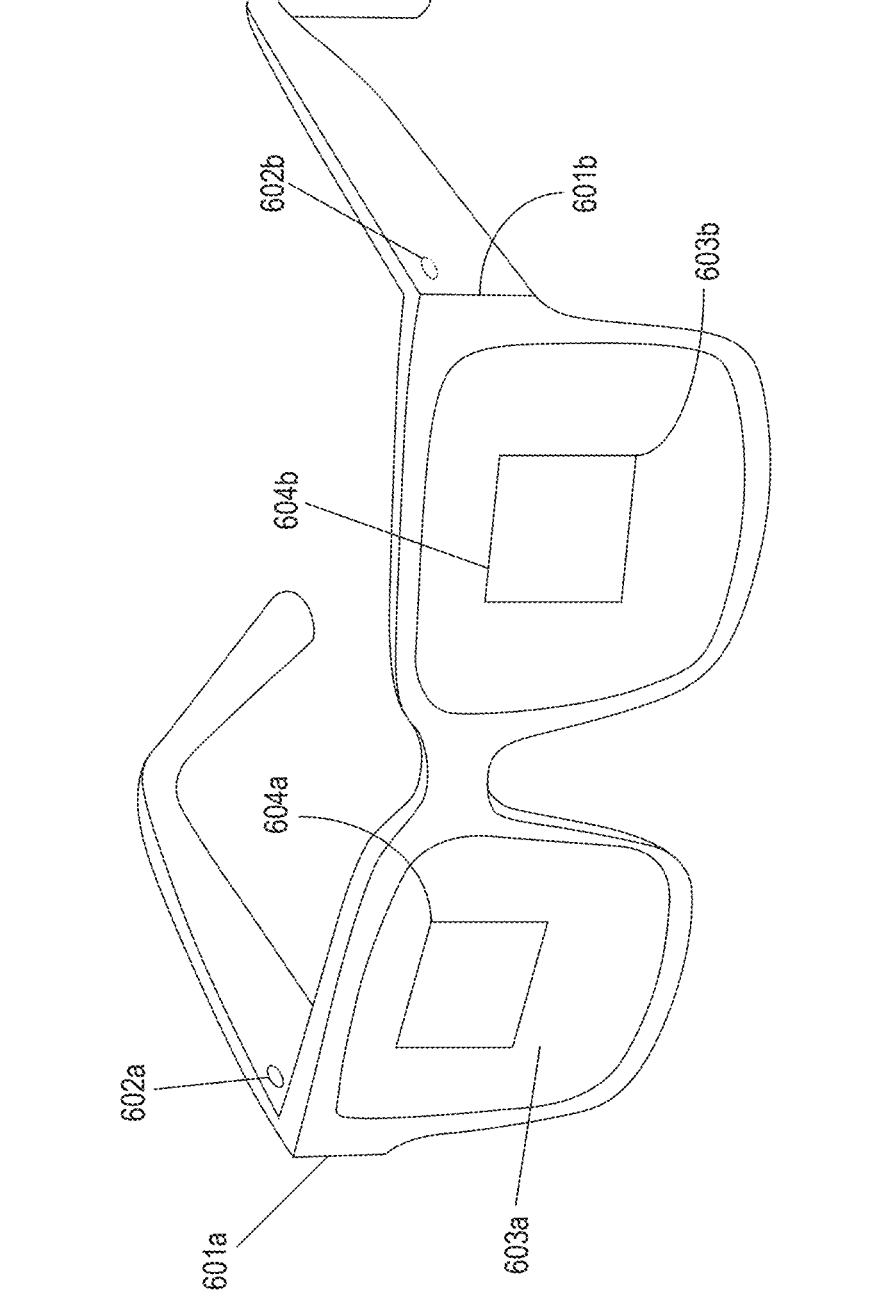
FIG. 6 illustrates diffractive elements of a diffractive surface on a display lens, according to an example.

FIG. 6 illustrates optical system 600 for eye tracking via point cloud scanning using a light beam source and a reflective and/or diffractive surface, according to an example. In some examples, a right temple arm 601*a* of the optical system 600 may include a right light beam emission and sensor element 602*a* mounted at an interior side of the right temple arm 601*a*. In some examples, a left temple arm 601*b* of the optical system 600 may include a left light beam emission and sensor element 602*b* mounted at an interior side of the left temple arm 601*b*.

In some examples, the right light beam emission and sensor element 602*a* may propagate one or more light beams to and/or through a redirection element 604*a* located on a display 603*a* of the optical system 600. In some examples, the redirection element 604*a* may include one or more diffractive and/or refractive elements that may redirect a light beam toward a viewing user's eye. Similarly, in some examples, the left light beam emission and sensor element 602*b* may propagate one or more light beams to and/or through a redirection element 604*b* located on a display 603*b* of the optical system 600. In some examples, the redirection element 604*b* may include one or more diffractive and/or refractive elements that may redirect a light beam toward a viewing user's eye.

Figure 7:
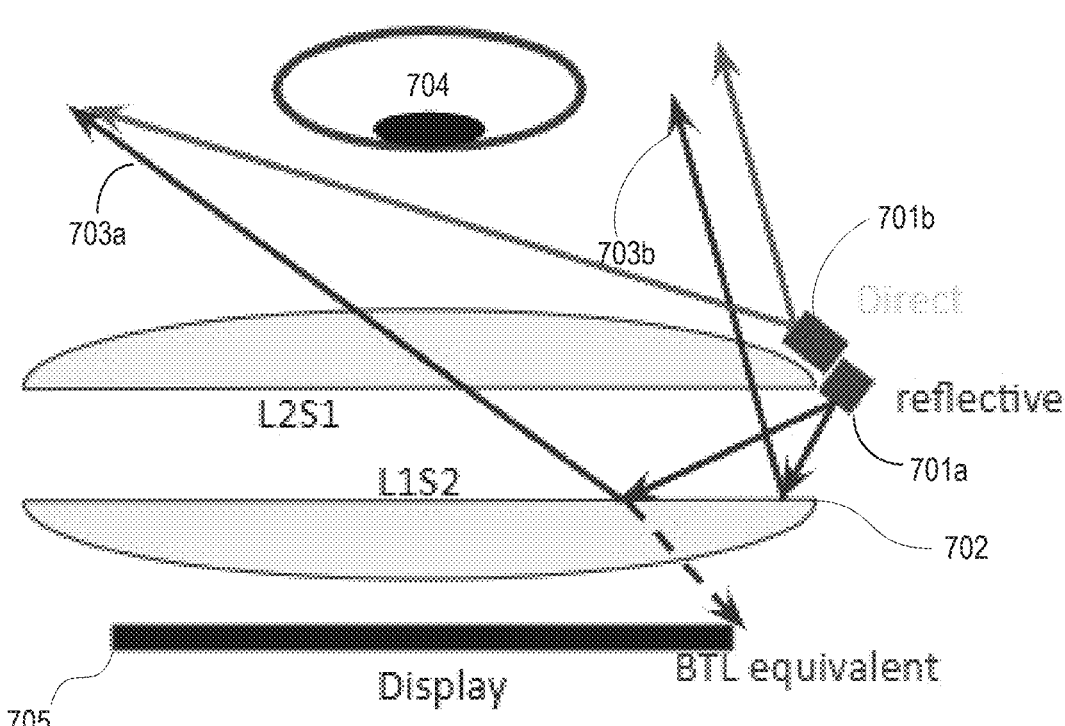
FIG. 7 illustrates optical system for eye tracking via a dense point cloud scanning using a light beam source and a reflective and/or diffractive surface, according to an example.

FIG. 7 illustrates an optical system 700 for eye tracking via point cloud scanning using a light beam source and a reflective and/or diffractive surface, according to an example. In particular, in some examples, the optical system 700 illustrated in FIG. 7 may indicate one or more placements of one or more light beam emission elements 701*a*-701*b* (e.g., a self-mixing interferometry (SMI) array) and a redirection component 702 (e.g., a pancake lens). In some examples, the redirection component 702 may include a reflective surface, as described above (e.g., via implementation of a hot mirror designed for reflecting particular self-mixing interferometry (SMI)-facilitating wavelengths). In other examples, the redirection component 702 may include a diffractive surface (e.g., a holographic optical element (HOE), as also described above.

In particular, in some examples, the light beam emission element 701*b* may emit one or more light beams towards the redirection component 702, and the one or more light beams 703*a*-703*b* may be redirected (e.g., reflected) in a general direction towards a viewing user's eye 704, as described above. It may be appreciated, that in some examples and to a certain (e.g., minimal) degree, some of the light from the one or more light beams 703*a*-703*b* may directed towards a display 705. In some examples, to ensure no interference with a viewing experience of a user, the redirection component 702 may include an anti-reflection coating for a visible light portion of the electromagnetic spectrum.

FIG. 8 illustrates a flow diagram for a method of implementing eye tracking via a dense point cloud scanning, according to some examples. The method 800 is provided by way of example, as there may be a variety of ways to carry out the method described herein. Although the method 800 is (primarily) described as being performed by the components of FIGS. 1-7, the method 800 may be executed or otherwise performed by one or more processing components of another system or a combination of systems. Each block shown in FIG. 8 may further represent one or more processes, methods, or subroutines, and one or more of the blocks may include machine-readable instructions stored on a non-transitory computer readable medium and executed by a processor or other type of processing circuit to perform one or more operations described herein.

At block 810, the method may include positioning one or more light beam emission and sensor elements at a first location of a display device.

At block 820, the method may include positioning a redirection element at a second location of the display device to redirect light to illuminate one of line-of-sight and a field-of-view (FOV) of the display device.

At block 830, the method may include emitting, via a first light beam emission and sensor element of the one or more light beam emission and sensor elements, a first light beam towards a user's eye.

At block 840, the method may include emitting, via a second light beam emission and sensor element of the one or more light beam emission and sensor elements, a second light beam towards the redirection element.

At block 850, the method may include redirecting the second light beam towards the user's eye.

In some examples, the systems and methods described herein may improve scanning accuracy and coverage, reduce occlusion effects, lower power consumption, and increase device efficiencies. Furthermore, in some examples, the systems and methods described herein may provide efficiency of integration of optical components, improved glint performance, and improved viewing of an eye box in a display device. As used herein, an "eye box" may be a two-dimensional box that may be positioned in front of the user's eye from which a displayed image from an image source may be viewed.

According to examples, an optical system for eye tracking via point cloud scanning using a light beam source and a reflective and/or diffractive surface is described herein. In addition, a method of making an optical system for eye tracking via point cloud scanning using a light beam source and a reflective and/or diffractive surface is described herein. A non-transitory computer-readable storage medium may have an executable systems stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An eye tracking system for an augmented reality (AR)/virtual reality (VR) display device, the eye tracking system, comprising:

a light beam emission and sensor element located in a first location of the display device to emit a light beam, the light beam emission and sensor element including a lens that broadens a scope of space over which the light beam is emitted, the lens including at least a lens element that is offset with respect to at least a corresponding light beam source element included as part of the light beam emission and sensor element; and a redirection element located in a second location of the display device to redirect the light beam to illuminate one of line-of-sight and a field-of-view (FOV) of the display device.

2. The eye tracking system of claim 1, wherein the light beam emission and sensor element includes one or more of a light beam source, a micro-electromechanical system (MEMS), and a photodetector (PD).

3. The eye tracking system of claim 1, wherein the first location is a temple arm of the display device.

4. The eye tracking system of claim 1, wherein the second location is a display lens of the display device.

5. The eye tracking system of claim 4, wherein the redirection element includes a diffractive surface.

6. The eye tracking system of claim 4, wherein the redirection element includes a reflective surface.

7. The eye tracking system of claim 1, wherein to acquire data associated with at least one of intensity, depth, and velocity for eye tracking.

8. The eye tracking system of claim 1, wherein the redirection element is further to collimate the light beam.

9. The eye tracking system of claim 1, wherein the redirection element includes a thin, transparent substrate having a pattern of rectangular grooves arranged to diffract display light.

10. The eye tracking system of claim 1, wherein the redirection element includes an reflective film, wherein the reflective film includes one or more multi-layer dielectric films tuned to reflect a particular wavelength band and a particular polarization.

11. The eye tracking system of claim 1, wherein the redirection element includes an anti-reflection coating for visible light.

12. The eye tracking system of claim 1, wherein the redirection element includes a holographic optical element (HOE) film.

13. A method for implementing eye tracking via a dense point cloud scanning, the method comprising:

positioning a light beam emission and sensor element at a first location of a display device;

positioning a redirection element at a second location of the display device to redirect light to illuminate one of line-of-sight and a field-of-view (FOV) of the display device;

emitting, via a first light beam emission and sensor element, a first light beam towards a user's eye;

broadening, using a lens included as part of the first light beam emission and sensor element, a scope of space over which the first light beam is emitted, the lens including at least a lens element that is offset with respect to at least a corresponding light beam source element that is included as part of the first light beam emission and sensor element;

emitting, via a second light beam emission and sensor element, a second light beam towards a redirection element; and redirecting the second light beam towards the user's eye.

14. The method of claim 13, wherein the redirection element includes a diffractive surface.

15. The method of claim 13, wherein the redirection element includes a reflective surface.

16. The method of claim 13, wherein the redirection element includes a thin, transparent substrate having a pattern of rectangular grooves arranged to diffract display light.

17. A non-transitory computer readable medium configured to store program code instructions, when executed by a processor, cause the processor to perform steps comprising:

emit, via a first light beam emission and sensor element, a first light beam towards a user's eye;

broaden, using a lens included as part of the first light beam emission and sensor element, a scope of space over which the first light beam is emitted, the lens including at least a lens element that is offset with respect to at least a corresponding light beam source element that is included as part of the first light beam emission and sensor element;

emit, via a second light beam emission and sensor element, a second light beam towards a redirection element; and redirect the second light beam towards the user's eye.

18. The non-transitory computer readable medium of claim 17, wherein the instructions, when executed by the processor, cause the processor to collimate, via the redirection element, at least one of the first light beam and the second light beam.

\* \* \* \* \*